UNITED STATES PATENT OFFICE.

PETER TOWNSEND AUSTEN, OF NEW BRUNSWICK, NEW JERSEY, ASSIGNOR TO THE WILLIAM J. MATHESON & COMPANY, LIMITED, OF NEW YORK, N. Y.

PROCESS OF MAKING SOLID EXTRACT OF SUMAC, HEMLOCK, AND OTHER TANNING AGENTS.

SPECIFICATION forming part of Letters Patent No. 495,768, dated April 18, 1893.

Application filed February 13, 1893. Serial No. 462,190. (No specimens.)

*To all whom it may concern:*

Be it known that I, PETER TOWNSEND AUSTEN, a citizen of the United States, and a resident of New Brunswick, in the county of Middlesex and State of New Jersey, have invented a certain new and useful Process for Making a Solid Extract of Sumac, Hemlock, and other Tannin Extracts, which is not affected by atmospheric temperature or moisture, of which the following is a specification.

Heretofore the tannin-matter extracted from sumac, and several other of the tannin-yielding materials, has been made and used in the arts in the form of a liquid, a paste, a so-called solid, which is of the consistency of thick pitch, and of a granulated solid, which, however, is easily affected by atmospheric heat and moisture, causing it to agglutinate, and pass from the state of granulation to that of a more or less solid mass. Sumac can be dried to a solid state by coating sheets of glass or other material not affected by it with it and drying them by heat, but the scales thus obtained are affected by atmospheric moisture, and agglutinate to lumps on standing exposed to moist air, especially such moist air as exists in the average dyehouse.

When in a liquid form, sumac extract easily suffers fermentation, especially in hot weather, which speedily causes a deterioration, or destruction, of the extract. It is sticky and disagreeable to handle, and more or less of it always remains in the barrels to waste. It is liable to leakage from the barrels, and evaporates from the open barrels in the dye-room, thereby altering in strength and causing embarrassment. The so-called solid, or pitchy form of sumac extract is difficultly and very slowly soluble in cold water and slowly soluble even in hot water. My invention meets and overcomes all of these objections, giving a solid brittle extract which can be easily powdered, and which is not affected by atmospheric heat or moisture. In this form of a dry powder it has the advantages of stability, rapid solubility in water, which are possessed by many coal tar dyes, and which allow facility in shipping, freedom from injury by fermentation, greater ease in weighing out and more rapid solution, as well as the advantages arising from the absence of unpleasant viscous and non-tannin matters which characterize the ordinary liquid extracts, or the deliquescent substances which characterize the commercial granulated solid sumac extracts.

To carry out my invention I gently heat ordinary extract of sumac, hemlock, or other tannin containing extract, and mix it, according to its strength and nature, with sodium or potassium nitrite, in the required proportions. The mixture is then allowed to stand for a short time, in order to set, and finally dried by heating, when it becomes solid and brittle on cooling, and will not become moist or injured when exposed to the atmosphere.

The method I have employed with most satisfactory results is as follows:—I heat ordinary liquid extract of sumac, which has been brought to a gravity of 85° Twaddle, to about 120° Fahrenheit and mix with it five per centum of granulated or powdered sodium nitrite, mixing them thoroughly. The mixture is then poured, or ladled, into shallow trays, or pans, and allowed to stand for a short time in order to set. A half an hour, to an hour, is usually sufficient for the crust to become formed. The sodium nitrite at once begins to act chemically upon the non-tannin matters and extractive substances to alter or decompose them and to evolve gas, which puffs up the mass and causes it to rise, much as dough is puffed up by carbonic acid gas during the process of fermentation by yeast, or by the decomposition of baking powder. This puffing up, and the maintenance of a porous mass caused by the evolution of bubbles of gas, is aided by the viscous nature of the extract. The porous nature of the mass thus obtained enables it to dry more quickly when heated. After the extract in the pan has risen to some extent, the pan and its contents are placed in a drying apparatus, and the mass is allowed to dry at a temperature of from 120°–150° Fahrenheit. The higher the temperature, up to 212° Fahrenheit, the more rapid will be the drying; but I have found it advisable to use a lower temperature than 200° or above, as the drying then takes place more evenly and satisfactorily. After the drying has taken place, the mass which is obtained is brittle, and can easily be ground to powder, and is not affected by atmospheric heat or moisture. It is practically soluble in cold water, and easily soluble in hot water. It may be used for mordanting cotton in the same way as the ordinary extracts of sumac, but it yields a deeper and fuller color on cotton when treated with ferric salts, than the commercial extracts of sumac.

The above method of procedure is the best to me at present known, but as heat and time are frequently convertible conditions in chemical reactions, and the amounts of the substances taken may vary depending upon their strength, I do not limit myself to the temperature nor to the exact proportions above set forth, the essence of my discovery and invention being that when sumac, or other tannin extracts, are mixed with sodium or potassium nitrites, or other suitable nitrites, under such conditions as to bring about a chemical reaction between them, a new product may be produced having the characteristics hereinbefore set forth.

Having thus described my invention, what I claim as new, and desire to patent, is—

1. In the art of making sumac extract, the improvement which consists in adding to sumac extract an alkaline nitrite in the presence of water, and causing a reaction between the nitrite and the extract substantially as described.

2. In the art of making sumac extract which consists in adding to sumac extract an alkaline nitrite, in the presence of water, causing a reaction between the nitrite and the extract, and evaporating the product to dryness, substantially as described.

3. As a new article of manufacture a solid extract of sumac derived from liquid extract of sumac by the incorporation therewith of an alkaline nitrite, and characterized by the fact of its being a friable solid, soluble in cold water, rapidly soluble in hot water, and not affected by atmospheric heat or moisture, substantially as described.

Signed at New York, in the county of New York and State of New York, this 10th day of February, A. D. 1893.

PETER TOWNSEND AUSTEN.

Witnesses:
E. SCHLEGEL,
BENJ. D. BACON.